Patented July 7, 1953

2,644,753

UNITED STATES PATENT OFFICE 2,644,753

AZO DYES AND THEIR USE IN COLOR PHOTOGRAPHY

Bela Gaspar, Beverly Hills, and Paul Daniel Dreyfuss, Van Nuys, Calif., assignors, by mesne assignments, to said Gaspar No Drawing. Application November 5, 1948, Serial No. 58,619

9 Claims. (Cl. 95—6)

The present invention relates to new azo dyes, to a method for their preparation and to their uses in color photography.

Processes of color photography depending upon the decolorization of dyes in the presence of metallic silver are well known. A process of this type in which azo dyes are employed in multilayer coatings to produce colored images by bleaching the dyes in the presence of silver images is disclosed in a number of patents, e. g., U. S. Patent 2,020,775. In this process azo dyes are uniformly distributed in photographic colloids, and these are coated on a transparent or opaque support. The material is exposed and developed and is then subjected to the action of a bath which destroys the dye locally in the presence of the metallic deposit of the photographic image. This results in the production of a dye image which is reversed with respect to the metal image.

In the co-pending patent application, Serial Number 537,967, filed May 29, 1944, now Patent No. 2,470,769, there are described a number of azo dyes which are useful in the above mentioned process and which belong to the class of high molecular weight dyes $$[-B(-Ar'-N=N)_a Ar''-]_n$$

wherein Ar' and Ar" stand for aliphatic, aromatic or heterocyclic radicals; B stands for a heteronuclear bond linking a plurality of dye units; $n$ stands for the integer greater than one, and $a$ stands for an integer from one to four, and the product of $a$ and $n$ is greater than two.

The term "heteronuclear bond" means a linkage, an atom or a radical which links a plurality of "dye units" (Ar'—N=N) Ar" provided that it interrupts the conjugation of the chain. The dye unit can be a monoazo dye ($a=1$), a true disazo ($a=2$), trisazo ($a=3$) or, generally, polyazo ($a>1$) dye. Whereas in a true polyazo dye, the azo groups are linked together by a conjugated system and, therefore, influence the chemical and optical qualities of each other, the dye units in the high molecular weight dyes, as herein defined, are linked together by heteronuclear bonds and, therefore, do not appreciably influence the chemical and optical qualities of each other.

The above general formula is valid for the simplest case of high molecular weight dyes containing heteronuclear bonds, i. e. it is valid for the case of only bivalent heteronuclear bonds such as —, —O—, —CH$_2$— or —SO$_2$—. If, however, all or part of the heteronuclear bonds are at least trivalent, such as N≡, the cyanuric nucleus, the pentaerythrityl residue, etc., the polymeric dyes are not straight chains as it would appear from the above formula, but form a two-or-three dimensional net of dye units. Dyes of this type are called "cross-linked" in the following:

One method of obtaining dyes, having a straight chain formed by dye units and heteronuclear bonds, and of analogous cross-linked polymeric dyes consists of coupling polyfunctional diazo components with polyfunctional azo coupling components.

In our co-pending application entitled Acylated Derivatives of Aminosulfonic Acids and Method for Their Preparation Serial No. 58,620 filed on an even date herewith, we have disclosed a number of polyfunctional azo coupling components. These new azo coupling components, if applied to the technique disclosed in application Serial Number 537,967, are converted into dyes which prove to be of particular value.

The components of our co-pending application entitled Acylated Derivatives of Aminosulfonic Acids and Method for Their Preparation which serve as starting materials in the manufacture of the new dyes of this invention, adhere to the general formula

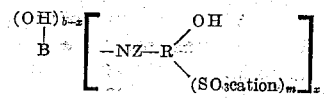

where R stands for the residue of naphthalene; whereas $m$ stands for one or two; Z stands for hydrogen or a hydrocarbon such as ethyl or phenyl radical; B(OH)$_{b-x}$ stands for the $x$ valent residue of a $b$-basic organic acid B(OH)$_b$, wherein $x$ is greater than one and $b$ is at least equal to $x$, such as —CO—CO—, A—(CO)$_b$, —A(—SO$_2$—)$_b$, (—CO—)$_p$A(—SO$_2$)$_q$— and a residue of the cyanuric type where A stands for a $b$-valent radical; where $b$ stands for an integer greater than one and where $p+q=b$.

Among the many azo coupling components of this general structure, we prefer those where $b=2$, where the groups —NZ— and —OH shown in the above formula stand in position —1,8 of the naphthalene residue R, and where Z stands for hydrogen. Of particular importance are those in which B(OH)$_{b-x}$ is an $x$-valent radical derived from a $b$-basic organic acid B(OH)$_b$ selected from the group consisting of polycarboxylic and polysulfonic acid radicals of hydrocarbons and oxahydrocarbons.

Suitable coupling components from which the dyes of this invention may be obtained are e. g. the following: N,N'-oxalyl-bis-J-acid; N,N'-adipyl-bis-(N-ethyl-gamma-acid); N,N'-azelayl-bis-M-acid; N,N'-sebacyl-bis-J-acid; N,N'-terephthaloyl - bis - H - acid; N,N' - m - phenylene-diacetyl-bis-K-acid; N,N'-diglycolyl-bis-H-acid; N,N' - hydroquinone - O - O - diacetyl - bis - H - acid; carbonyl - bis - [(4 - aminobenzoyl) - H - acid]; succinyl - bis - [6 - (p - aminophenyl-ureido) - 1 - naphthol - 3 - sulfonic acid]; N,N' - naphthalene - 1.5 - disulfo - K - acid; N,N' - benzidinesulfonedisulfo - S - acid; furfurane - 2,5 - dicarboxylyl - H - acid; N,N' - (benzoyl - m - sulfo) - bis - J - acid; 2 - (p-sulfanilino) - 4, 6 - di[1 - hydroxy - 3,6 - disulfonaphthylamino - (8)] - s - triazine; N,N',N''- tricarballylyl - tris-J-acid; S-triazine-2,4,6-tricarboxylyl-acid; adipyl - bis - (aminoterephthaloyl - bis - K - acid).

The coupling compounds of the above exemplified class are coupled with polydiazo compounds derived from polyamino compounds such as: 3,3'-diamino - 4,4'-dimethoxydiphenylmethane; 1,1-di - (p - aminophenyl) - cyclohexane; 4,4' - di - (p - aminobenzoyl) - amino - stilbene - 2,2' - disulfonic acid; hydroquinone - di - (3 - amino - 4 - propyloxybenzyl) ether; 4,4' - diaminodiphenylether; 4,4' - diaminodiphenylsulfone - X,X - disulfonic acid; sebacyl - bis - (3 - amino - 4 - methoxybenzylamide); adipyl - bis - (2 - methoxy - 5 - amino - anilide); pyrogallol - tri - (3 - amino - 4 - methoxbenzyl) - ether; 2,4,6 - tri - (p - amino - m - sulfanilino - s - triazine and the tetrazo compounds of U. S. Patent No. 2,263,994, such as, for example, tetrazotized sebacic-di-(4-amino-1-N-ethyl-anilide) and tetrazotized oxalic-di-(4-amino-2-N-benzyl toluidide.

Among the polymeric azo dyes produced by coupling these polydiazo compounds with the above exemplified polyfunctional acylaminonaphtholsulfonic acids many red, magenta, violet, blue and cyan dyes are found which satisfy the highest requirements for multilayer photographic materials.

The components are easily available. The dyes, having a sufficiently high molecular weight, do not diffuse within photographic colloids; they have high tinctorial power, and many dyes of this class are easily soluble, fast to light, very brilliant and are easily bleached at the places where metallic silver is present. They are reduced in this bleaching process to form low molecular weight compounds which are easily removed from the photographic colloid by washing.

Polymeric dyes, containing polyfunctional acylaminonaphthol sulfonic acids as coupling components can be obtained by the above indicated method (i. e. by coupling the polyfunctional acylaminonaphtholsulfonic acids with polydiazo compounds) or by other methods, as will be seen from the examples below.

If the dyes are prepared by coupling polyvalent diazo compounds with polyfunctional acylaminonaphtholsulfonic acids, they will consist of a large but undetermined number of dye units. In some cases it is experimentally impossible to couple all available diazo functions with all available coupling positions. However, even in the case of complete coupling, a mixture of polymer homologous dyes is formed, i. e. a mixture of dyes which differ from each other by the number of dye units which are present in each individual dye molecule. All dyes represented in this mixture have the same shade but they are different in other respects. For example, they are adsorbed with different ease to vegetable fiber or to activated aluminum oxide, or they precipitate with different ease from aqueous solution by the addition of electrolytes. It is therefore possible to separate the larger dye molecules from the smaller ones by fractional precipitation, by fractional adsorption, by dialysis through suitable membranes and by other means peculiar to each case. It has also been found that mixtures of polymeric dyes containing a large but undetermined number of dye units obtained from other low molecular components, such as, compounds having both diazo and coupling functions and mixtures comprising low molecular weight azo dyes having reactive groups and polyfunctional compounds which are capable of linking a plurality of said relative groups, may also be fractionated advantageously in order to obtain improved dye products.

The average number of dye units in a polymer homologous mixture can be influenced by varying the proportion of the components; e. g., the polydiazo compounds can be coupled with polyvalent acylaminonaphthol sulfonic acids so that essentially each diazo group and essentially each naphthol residue take part in the reaction (coupling 1:1), or one of the components may be present in excess. If one of the components is in excess, the average molecular weight of the polymeric dye decreases, and the dye will contain terminal groups such as free coupling positions or diazo groups or derivatives of conversion from the diazo groups which have marked influence on the physical properties of the dye. E. g., the behaviour of the dye in the fractionation, the viscosity of its aqueous solution, its affinity to substrata, and its diffusion in photographic colloids vary according to the proportion of the components used in the coupling of the dye.

The character of the terminal groups has furthermore some influence on the substantivity of the dye with respect to gelatin. Both the substantivity and the molecular size of the dye contribute to its fastness with regard to diffusion. As a small molecule obviously comprises more terminal groups than a large molecule does, we found it advantageous in some cases to sacrifice molecular size in favor of terminal groups. That is, the optimum results with regard to diffusion are not necessarily obtained with dyes which are prepared from polydiazo compounds and polyvalent coupling components in a ratio 1:1 but other coupling proportions such as 2:1 or 1:2 may be preferable. Sometimes wide variations are possible, particularly when the components contain three or more functional groups. For example, to mention an extreme case, N-(3-amino-4 - methoxy - benzyl) - anhydroaminobenzylalcohol can be completely diazotized and coupled in proportions varying between 4:1 and 1:4 with the product obtained from an ethylene-maleic anhydride interpolymer and H-acid (our co-pending application entitled Acylated Derivatives of Aminosulfonic Acids and Method for Their Preparation). All the magneta dyes obtained from these two components do not diffuse, and all of them are easily water soluble.

Like the dyes obtained by coupling polydiazo with polyvalent coupling compounds, other dyes obtained by polycondensation must not necessarily be produced with the highest molecular weight possible. For example, a compound comprising one diazotizable amino group and one coupling function such as the intermediate of Example 2 below, if diazotized and coupled with itself, is converted into a polymer homologous dye mixture, particularly when the diazotization and/or the coupling are incomplete. This mixture of dyes can be separated into fractions which are optically identical but are different in other respects.

Polymer homologous dye mixtures obtained by condensing simple dyes having a plurality of reactive terminal groups, such as amino groups, with polyvalent reagents, such as halides of polyacids, can be likewise improved by fractionation.

If a polyfunctional diazo component is coupled with a polyfunctional coupling component in a proportion other than 1:1, the coupling product can be modified by subsequent addition of a component able to react with the terminal groups of said coupling product; e. g., a dye obtained by coupling a polydiazo compound with an excess of a polyfunctional coupling component, can be modified by after-treatment with a monodiazo compound.

It must be determined empirically in each case, in what proportion the diazo and the coupling components are to be combined in order to produce a non-diffusing polymeric dye. Generally, an excess of diazo compound up to 100% has a beneficial effect on the fastness of the dye with regard to diffusion; however, in some cases an excess of coupling compound up to 100% acts in the same way. In other cases the optimum results are obtained by coupling 1:1. A 2 to 3 percent variation in the proportions generally causes noticeable differences in the physical properties of the dye obtained. In certain cases a dye, obtained by coupling 1:1, if dissolved and added to the emulsion, increases the viscosity of the emulsion and makes it difficult to obtain an even coating. A deviation of a few percent from the proportion 1:1 will lower the viscosity of the dye solution without appreciably changing the fastness of the dye with regard to diffusion.

*Example 1*

1.3 mols of 4,4'-diaminodiphenylether is tetrazotized and coupled in aqueous pyridine with 1.0 mol of N,N'-adipyl-bis-(1-amino-8-hydroxynaphthalene-3,6-disulfonic acid), described in our copending application entitled Acylated Derivatives of Aminosulfonic Acids and Method for Their Preparation. A brilliant magneta dye forms which, if tested in photographic gelatin, shows traces of diffusion. The dye is isolated and treated in weakly acidic solution with such an amount of alumina as to adsorb 15% of the total dye weight. The dye in solution (85%) is completely freed from aluminum ions and isolated as the sodium salt. The absorbed dye (15%) is eluted with sodium carbonate and isolated in the same manner. While the fraction which had been adsorbed diffuses about ten times as much as does the raw dye, the other 85% of the dye is completely fast to diffusion, even after prolonged treatment in alkaline processing baths. The diffusing and the non-diffusing fractions have the same absorption spectrum; both are very water soluble, cause no densitization of the emulsion and are quite stable to light.

If the components of the above example are coupled in a ratio 1.5:1, a raw dye is obtained which diffuses less than the raw dye obtained in the coupling 1.3:1. This improved raw dye can be fractionated in the indicated manner to yield over 90% of a dye which is completely fast to diffusion.

Whereas the above dye is produced by coupling a polydiazo compound with a polyfunctional coupling component, dyes of this invention can be obtained in other ways as well.

*Example 2*

One mol of p-phenylenediaminesulfonic acid is stirred in aqueous solution at 0° C. in the presence of an excess of sodium acetate with the dichloride of 2-furoic acid-5-sulfonic acid (1 mol). After 1 hour H-acid (1 mol) is added and the temperature slowly raised. The product which can be isolated from the reaction mixture by addition of potassium carbonate is believed to have the following structure:

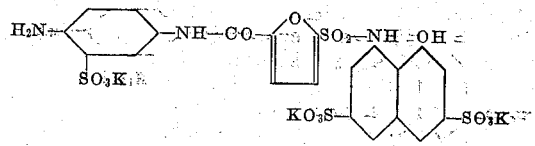

If this compound is treated with nitrous acid at pH=5 or with nitrous acid at low pH (about 2) and thereupon the pH is raised to 8, a brilliant magenta dye forms, which, even without fractionation, diffuses only very little in gelatin.

*Example 3*

The intermediate of the foregoing example can serve in the synthesis of a polymeric dye having a determined number of azo units. E. g., 3,3'-diamino-4,4'-dimethoxydiphenylmethane (1 mol) is tetrazotized and coupled with 2 mols of the above intermediate. If the resulting product is tetrazotized and coupled with a terminal coupling component such as (2,4-dichlorobenzoyl)-K-acid, a non-diffusion magenta tetrakisazo dye is obtained.

Other colors can be produced by coupling the tetrazotized diaminodisazo dye of this example with different terminal coupling components; e. g., non-diffusing red dyes are produced by coupling it with succinyl-bis-(p-aminophenyl)-pyrazolonecarbonic acid or with glycerin-$\alpha,\alpha'$-bis-acetoacetate.

*Example 4*

One mol of 4-chloro-2-aminoanisole is diazotized and coupled with 1 mol of N,N'-(aminohydroquinone-O-O-diacetyl)-bis-H-acid (obtained by reduction of the corresponding nitro compound). The dye which forms is supposed to be essentially a mono azo dye. This dye is diazotized and coupled with itself whereby a non-diffusing polymeric azo dye of undetermined molecular weight is formed.

If in the first operation 2 mols of chloranisidine were used, an aminodisazo dye forms which by diazotization and coupling it with 2,4-dichlorobenzoyl-K-acid is converted into a non-diffusing magneta trisazo dye.

*Example 5*

2-naphthylamine-4,8-disulfonic acid is diazotized and coupled with 1-naphthylamine-7-sulfonic acid. A monoazo dye forms which is diazotized and coupled with 2-ethoxy-1-naphthylamine-7-sulfonic acid. The disazo dye which forms is a well known intermediate. It is customary in the manufacture of trisazo dyes to diazotize this intermediate and couple it with a terminal component without particular precautions. However, in order to prepare the polyazo dye of this example, it is necessary to isolate said intermediate in a pure state. It is repeatedly dissolved and reprecipitated by addition of salt until all impurities are removed. This purification is performed in a neutral solution, and heating of the dye should be avoided.

Two molecular parts of the disazo dye are diazotized and coupled at —15° C. in 70% aqueous pyridine with one molecular part of N,N'-adipyl - bis - (2 - amino - 5 - naphthol - 7 - sulfonic acid). A cyan dye forms which is purified by reprecipitation from water and finally by precipitation with acetone from the aqueous solution. The dye does not diffuse and has excellent photographic properties.

Example 6

An emulsion sensitized to red light and containing a cyan dye is coated on an opaque support as described in Example 4 of our co-pending application, S. N. 18,714. A silver halide gelatin emulsion sensitized to green light and containing the non-diffusing fraction of the magenta dye of Example 1 (0.5 gr./100 ml. emulsion) is coated thereon. A yellow filter layer and a blue sensitive silver halide emulsion layer containing a yellow azo dye are coated on top, to complete a color photographic printing material. This material is exposed to light through a colored transparency, developed, bleached in a bleaching bath such as described in U. S. Patent Re. 22,308, washed to remove the reduction products from the material, and liberated from silver and silver salts in known manner. A print in natural colors results.

Example 7

An acid suspension of one mol of tetrazotized benzidine 2,2'-disulfonic acid is poured into an acid solution of 2.2 mols of o-anisidine, the solution is buffered with sodium acetate until only weakly acidic to Congo paper, the solution is stirred for 24 hours to allow for complete coupling, heated to 80° C. and cooled. The dye is filtered, slurried in diluted hydrochloric acid, filtered, washed with alcohol and dried.

400 grams of the dry dye are stirred into 1.6 liters of fuming sulfuric acid (30% SO$_3$) at a temperature below 10° C. The sulfonation mixture is kept at room temperature for three days and stirred slowly into crushed ice. The sulfonated dye is precipitated with sodium chloride, filtered and purified by reprecipitation with sodium chloride from aqueous solution.

A tetrazo solution, prepared from 1.1 mol of the sulfonated dye, is added to a pyridine solution of 1.0 mol of adipyl-bis-H-acid at 0° C. After two hours the solution is heated to 70° C., cooled to room temperature and acidified by addition of hydrochloric acid. The dye is precipitated by addition of salt, filtered, washed with salt solution, dissolved in water, precipitated with sodium acetate, filtered and washed with alcohol.

The magenta dye, thus obtained, is believed to have essentially the following structure:

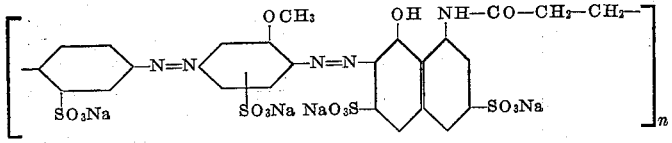

This magenta dye is well water soluble, stable to light, and a photographic layer dyed with this dye, bleaches well at the places where metallic silver is present. For most purposes, the dye can be regarded as non-diffusing. However, it is seen from rigid tests, i. e. at a high dye/gelatin ratio, that the diffusion is still noticeable.

If this dye is dissolved in a sodium carbonate solution and precipitated with a quantity of sodium chloride which is insufficient for complete precipitation, a fraction is obtained which has the same characteristics as has the raw dye except that it diffuses less. E. g., a 65% recovery in one reprecipitation yields a dye which diffuses less than half of what the original dye diffuses. A repeated reprecipitation yields a still less diffusing dye.

The dyes of this invention are suitable for use in emulsion and in light screening layers, in overcoats and interlayers, in photographic film, plates or paper. They can be used to dye the photographic colloid itself, or to dye up resins which afterwards may be dispersed in photographic colloids. They can be mixed with unsensitized emulsions or with emulsions which are sensitized to any color. They may be incorporated in any or all desired layers of a multilayer coating. The sensitive compositions containing these dyes may be coated on transparent or opaque supports, in single-layer or multi-layer coatings, or in multi-layer coatings on one or both sides of a support. The dyes of this invention, incorporated into one or more layers of photographic material, may be bleached locally at the places where metallic silver is present by treatment in an acid, neutral or alkaline bleaching bath; or they may be bleached or converted into other colored substances locally at the places where developable silver salts are present, by treatment in suitable developers.

The properties of the dyes of this invention, particularly their reduced tendency to penetrate colloids, make them valuable not only for photographic purposes, but as well in other fields, e. g., in the dyeing of textiles and of artificial resins.

Since from the foregoing description of the invention it will be apparent to those skilled in the art that many variations of this invention may be made without departing from the spirit and scope thereof, it is to be understood that we do not limit ourselves to the specific examples thereof, except as defined in the appended claims.

We claim:

1. A photographic material including a silver containing image forming layer and a colloid comprising an azo dye comprising at least one radical of the formula

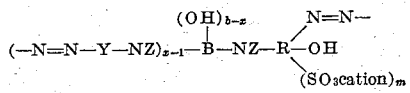

wherein B(OH)$_{b-x}$ stands for the $x$ valent residue of a $b$-basic organic acid B(OH)$_b$, where $x$ stands for an integer greater than one and $b$ is an integer at least equal to $x$, Z stands for a radical selected from the group consisting of hydrogen, alkyl and aryl radicals, R is a naphthalene nucleus, $m$ is an integer selected from the group consisting of one and two, Y stands for a bivalent aromatic radical, where the azo groups shown in the formula are part of a total of $n'$ azo groups, said $n'$ groups being arranged in $n$ dye units separated from each other by heteronuclear bonds, each unit comprising

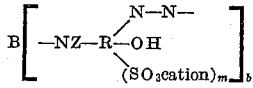

where $a$ stands for an integer from one to four, where $n'=a.n$ and is greater than $b$ and where $n$ is an integer greater than one.

2. A photographic material including a silver containing image forming layer and a colloid comprising an azo dye comprising at least one radical $$B\left[-NZ-R\begin{smallmatrix}N=N-\\OH\\(SO_3\text{cation})_m\end{smallmatrix}\right]_b$$

wherein B stands for the $b$ valent residue of a $b$-basic organic acid $B(OH)_b$ wherein $b$ is an integer greater than one, Z stands for a radical selected from the group consisting of hydrogen, alkyl and aryl radicals, R is a naphthalene nucleus, $m$ is an integer selected from the group consisting of one and two, where the azo groups shown in the formula are part of a total of $n'$ azo groups, said $n'$ azo groups being arranged in $n$ dye units separated from each other by heteronuclear bonds, each unit comprising $$a=\frac{n'}{n}\text{ azo groups}$$

where $a$ stands for an integer from one to four, where $n'=a.n$ and is greater than $b$ and where $n$ is an integer greater than one.

3. A photographic material including a silver containing image forming layer and a colloid comprising an azo dye comprising at least one radical

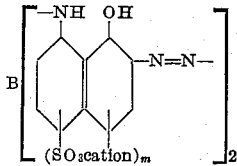

where B stands for the residue of a dibasic organic acid $B(OH)_2$, where $m$ is an integer selected from the group consisting of one and two, where the azo groups shown in the formula are part of a total of $n$ azo groups separated by heteronuclear bonds, and where $n$ is greater than two.

4. A photographic material including a silver containing image forming layer and a colloid comprising an azo dye comprising the radical

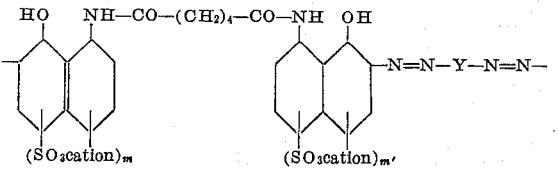

where Y is a bivalent aromatic radical, and $m$ and $m'$ are each selected from the group consisting of one and two said azo dye comprising at least three azo groups.

5. A photographic material including a silver containing image forming layer and a colloid comprising an azo dye formed by coupling tetrazotized diaminodiphenyl ether with adipyl-bis-H-acid.

6. A process for producing a colored image in a colored photographic colloid layer containing a silver image, said layer being dyed with an azo dye comprising at least one radical of the formula

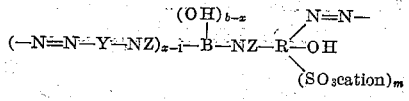

wherein $B(OH)_{b-x}$ stands for the $x$ valent residue of a $b$-basic organic acid $B(OH)_b$, where $x$ stands for an integer greater than one and $b$ is an integer at least equal to $x$, Z stands for a radical selected from the group consisting of hydrogen, alkyl and aryl radicals, R is a naphthalene nucleus, $m$ is an integer selected from the group consisting of one and two, Y stands for a bivalent aromatic radical where the azo groups shown in the formula are part of a total of $n'$ azo groups, said $n'$ groups being arranged in $n$ dye units separated from each other by heteronuclear bonds, each unit comprising $$a=\frac{n'}{n}\text{ azo groups}$$

where $a$ stands for an integer from one to four, where $n'=a.n$ and is greater than $b$ and where $n$ is an integer greater than one, which comprises treating said colloid layer to locally destroy by reduction said dye in the presence of said silver image.

7. A process for producing a colored image in a colored photographic colloid layer containing a silver image, said layer being dyed with an azo dye comprising at least one radical

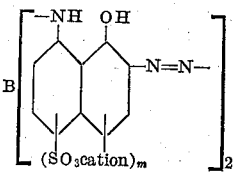

where B stands for the residue of a dibasic organic acid $B(OH)_2$, where $m$ is an integer selected from the group consisting of one and two, where the azo group shown in the formula is part of a total of $n$ azo groups separated by heteronuclear bonds, and where $n$ is greater than two, which comprises treating said colloid layer to locally destroy by reduction said dye in the presence of said silver image.

8. A process for producing a colored image in a colored photographic colloid layer containing a silver image said layer being dyed with an azo dye formed by coupling tetrazotized diaminodiphenyl ether with adipyl-bis-H-acid which comprises treating said colloid layer to locally destroy by reduction said dye in the presence of said silver image.

9. A photographic material including a silver containing image forming layer and a colloid comprising an azo dye formed by coupling a polydiazo compound with a coupling component of the formula

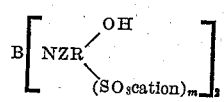

wherein R is a naphthalene nucleus, Z is a radical selected from the group consisting of hydrogen, alkyl and aryl radicals, $m$ is an integer selected from the group consisting of one and two and B is the divalent radical of a dicarboxylic aliphatic acid.

BELA GASPAR.
PAUL DANIEL DREYFUSS.

References Cited in the file of this patent

UNITED STATES PATENTS

| Number | Name | Date |
|---|---|---|
| 1,938,976 | Payne | Dec. 12, 1933 |
| 2,071,688 | Gaspar | Feb. 23, 1937 |
| 2,182,348 | Murphy et al. | Dec. 5, 1939 |
| 2,361,541 | Gaspar | Oct. 31, 1944 |
| 2,376,822 | Schneider et al. | May 22, 1945 |
| 2,463,838 | Wilson | Mar. 8, 1949 |
| 2,470,769 | Gaspar | May 24, 1949 |

FOREIGN PATENTS

| Number | Country | Date |
|---|---|---|
| 503,752 | Great Britain | Apr. 11, 1939 |
| 607,792 | Great Britain | Sept. 6, 1948 |
| 617,115 | Great Britain | Feb. 1, 1949 |